US006868293B1

(12) United States Patent
Schurr et al.

(10) Patent No.: US 6,868,293 B1
(45) Date of Patent: Mar. 15, 2005

(54) SYSTEM AND METHOD FOR ENERGY USAGE CURTAILMENT

(75) Inventors: Allan J. Schurr, Danville, CA (US); Gaymond Yee, Oakland, CA (US)

(73) Assignee: Itron, Inc., Spokane, WA (US)

( * ) Notice: Subject to any disclaimer, the term of this patent is extended or adjusted under 35 U.S.C. 154(b) by 808 days.

(21) Appl. No.: 09/677,700

(22) Filed: Sep. 28, 2000

(51) Int. Cl.[7] ................................................ G05B 11/01

(52) U.S. Cl. ......................... 700/22; 700/276; 700/286; 700/291; 700/295; 323/211; 323/304; 323/318

(58) Field of Search ............................. 700/22, 65, 66, 700/286, 276, 291, 295; 323/211, 304, 318

(56) References Cited

U.S. PATENT DOCUMENTS

| | | | | |
|---|---|---|---|---|
| 4,551,812 | A | 11/1985 | Gurr et al. | 364/492 |
| 5,216,623 | A | 6/1993 | Barrett et al. | 364/550 |
| 5,404,136 | A | 4/1995 | Marsden | 340/870.03 |
| 5,566,084 | A | 10/1996 | Cmar | 364/492 |
| 5,572,438 | A | 11/1996 | Ehlers et al. | 364/492 |
| 5,576,700 | A | 11/1996 | Davis et al. | 340/825.16 |
| 5,696,695 | A | 12/1997 | Ehlers et al. | 364/492 |
| 5,706,191 | A | 1/1998 | Bassett et al. | 364/138 |
| 5,729,474 | A | 3/1998 | Hildebrand et al. | 364/557 |
| 5,732,193 | A | 3/1998 | Aberson | 395/10 |
| 5,761,083 | A | 6/1998 | Brown, Jr. et al. | 364/492 |
| 5,793,974 | A | 8/1998 | Messinger | 395/200.54 |
| 5,794,212 | A | 8/1998 | Mistr, Jr. | 705/26 |
| 5,924,486 | A | 7/1999 | Ehlers et al. | 165/238 |
| 5,958,012 | A | 9/1999 | Battat et al. | 709/224 |
| 5,974,403 | A | 10/1999 | Takriti et al. | 705/412 |
| 6,021,402 | A | 2/2000 | Takriti | 705/412 |
| 6,088,659 | A | 7/2000 | Kelley et al. | 702/62 |
| 6,105,000 | A | 8/2000 | Hickman et al. | 705/10 |
| 6,141,595 | A | 10/2000 | Gloudeman et al. | 700/83 |
| 6,178,362 | B1 | 1/2001 | Woolard et al. | 700/295 |
| 2002/0007388 | A1 * | 1/2002 | Bannai et al. | 709/104 |
| 2002/0019758 | A1 * | 2/2002 | Scarpelli | 705/7 |

FOREIGN PATENT DOCUMENTS

| | | | |
|---|---|---|---|
| FR | 2660511 | 10/1991 | H02J/13/00 |
| WO | WO 02/27639 A1 * | 4/2002 | G06F/19/00 |
| WO | WO 02/027687 A1 * | 4/2002 | G08B/23/00 |

OTHER PUBLICATIONS

PCT Written Opinion dated Feb. 13, 2003 corresponding to PCT/US01/42363.

NETO: "Distribution by demand side management"; Transmission & Distribution World, Dec. 1997, vol. 49, No. 13, pp. 39–44, see entire article.

* cited by examiner

*Primary Examiner*—Ramesh Patel
(74) *Attorney, Agent, or Firm*—Gray Cary Ware & Freidenrich LLP

(57) ABSTRACT

A system and method are disclosed for performing energy usage management within a network. The system may include an energy management system, such as a thermostat device, that may be associated with an energy consuming entity, such as a residence. A server may be remotely located from the energy consuming entity and may perform one or more energy curtailment management operations within the network. The server may be in communication with the energy management system over the network. One or more software applications may be stored thereon for remotely controlling the energy management system in accordance with a particular energy curtailment management operation. Additionally, a database may be associated with the server for storing curtailment event information relating to the network. A signal may be transmitted by the server to the thermostat device to alter an offset temperature setting of the thermostat device thereby remotely controlling the operation of the thermostat device. The thermostat device may also include a networking software application for enabling the remote monitoring and controlling of the thermostat device.

15 Claims, 12 Drawing Sheets

10
SERVER 12
20 CPU
18
19
21 DB
ENERGY SERVICE PROVIDER
16 WAN
26
32
44 42 40 34
38
36
14
28 MODEM
24 THERMOSTAT
30
22 HVAC 14
28
MODEM
24
THERMOSTAT
30
22
HVAC 38
36
34
40
42
44
32
16
WAN
ENERGY
SERVICE
PROVIDER
26
12
18
19
SERVER
20
CPU
21
DB
10

Figure 7:
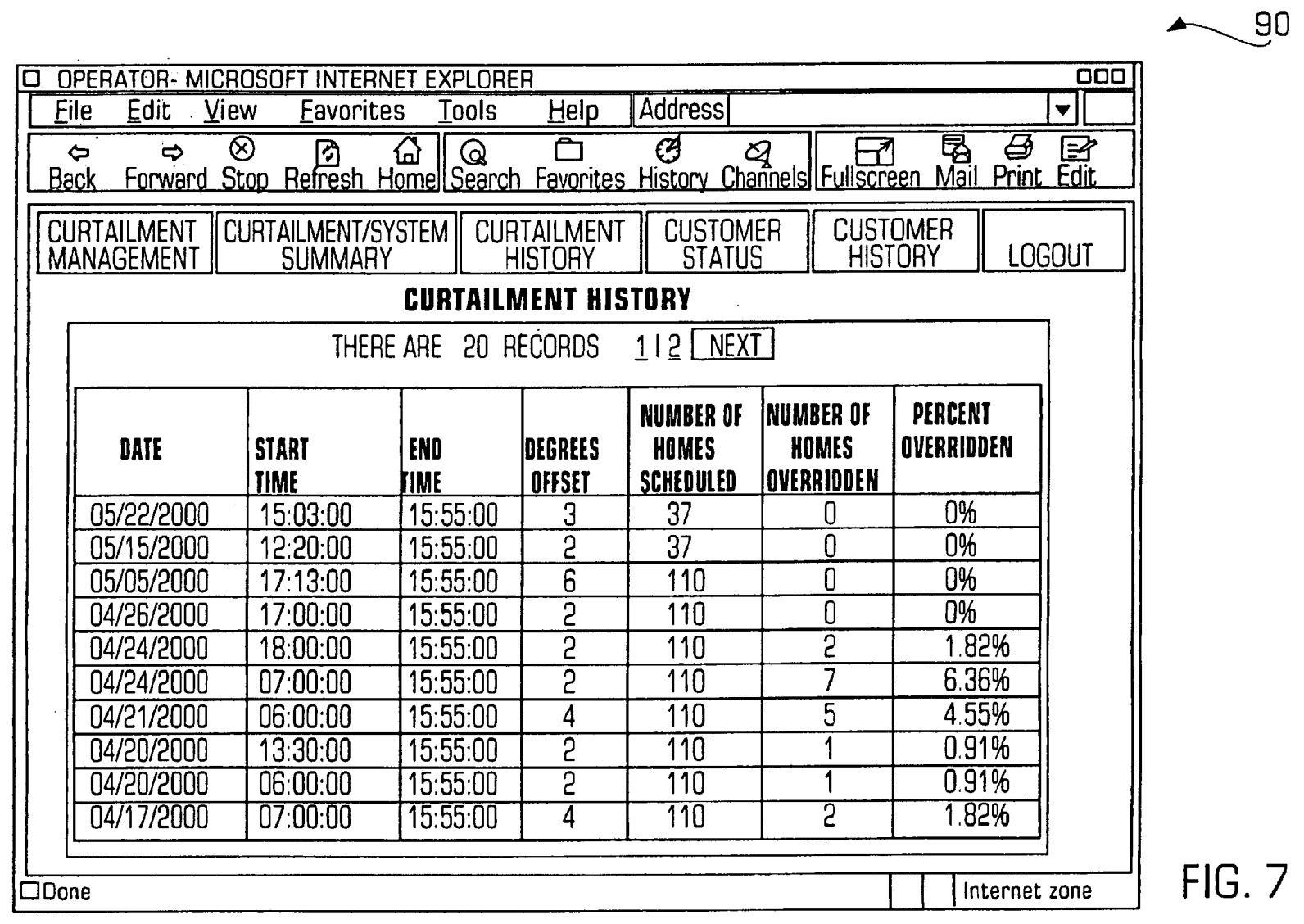

90

OPERATOR- MICROSOFT INTERNET EXPLORER

File Edit View Favorites Tools Help Address

Back Forward Stop Refresh Home Search Favorites History Channels Fullscreen Mail Print Edit CURTAILMENT MANAGEMENT | CURTAILMENT/SYSTEM SUMMARY | CURTAILMENT HISTORY | CUSTOMER STATUS | CUSTOMER HISTORY | LOGOUT

CURTAILMENT HISTORY

THERE ARE 20 RECORDS 1 | 2 NEXT

| DATE | START TIME | END TIME | DEGREES OFFSET | NUMBER OF HOMES SCHEDULED | NUMBER OF HOMES OVERRIDDEN | PERCENT OVERRIDDEN |
|---|---|---|---|---|---|---|
| 05/22/2000 | 15:03:00 | 15:55:00 | 3 | 37 | 0 | 0% |
| 05/15/2000 | 12:20:00 | 15:55:00 | 2 | 37 | 0 | 0% |
| 05/05/2000 | 17:13:00 | 15:55:00 | 6 | 110 | 0 | 0% |
| 04/26/2000 | 17:00:00 | 15:55:00 | 2 | 110 | 0 | 0% |
| 04/24/2000 | 18:00:00 | 15:55:00 | 2 | 110 | 2 | 1.82% |
| 04/24/2000 | 07:00:00 | 15:55:00 | 2 | 110 | 7 | 6.36% |
| 04/21/2000 | 06:00:00 | 15:55:00 | 4 | 110 | 5 | 4.55% |
| 04/20/2000 | 13:30:00 | 15:55:00 | 2 | 110 | 1 | 0.91% |
| 04/20/2000 | 06:00:00 | 15:55:00 | 2 | 110 | 1 | 0.91% |
| 04/17/2000 | 07:00:00 | 15:55:00 | 4 | 110 | 2 | 1.82% |

Done Internet zone

Figure 8A:
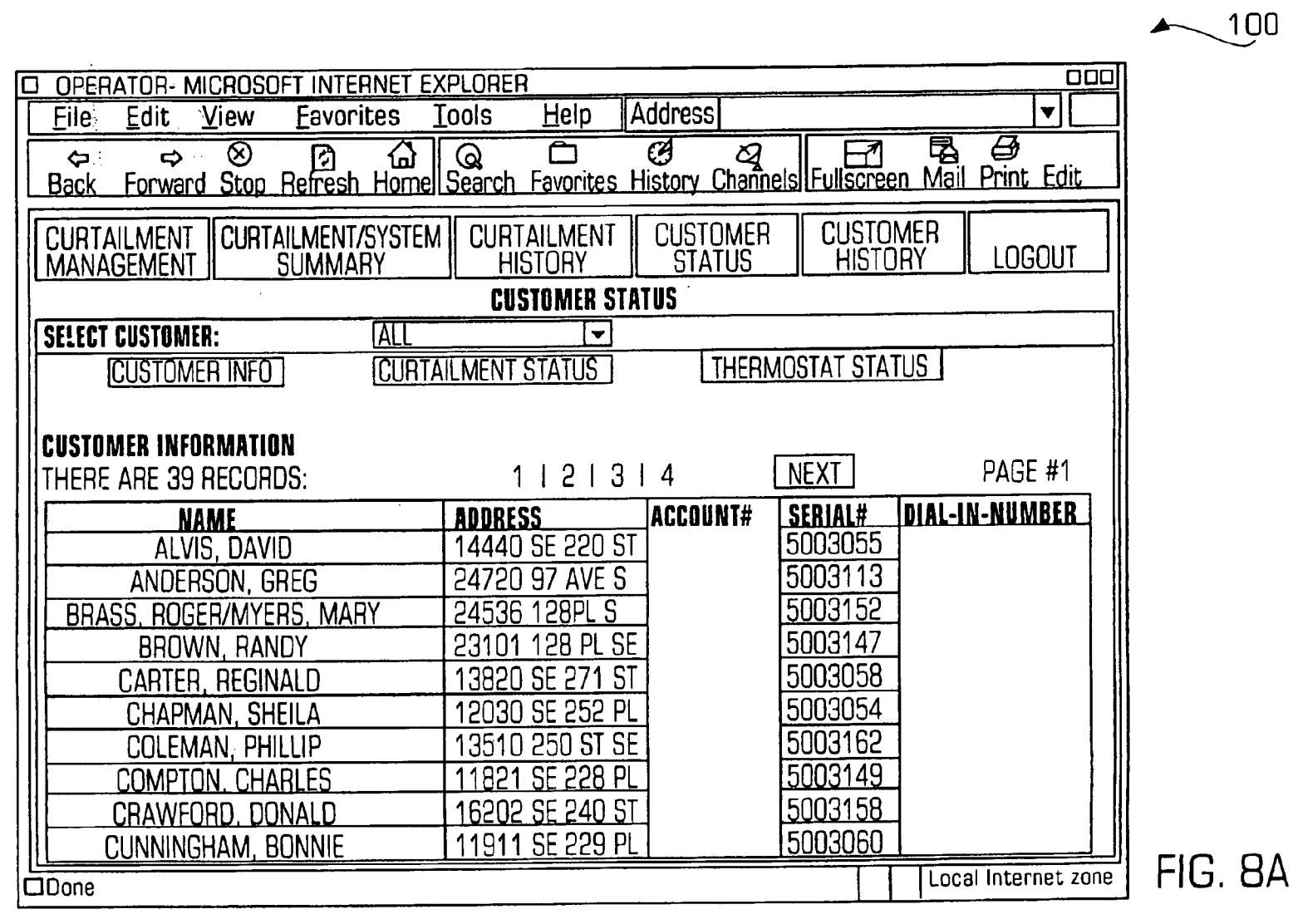

OPERATOR- MICROSOFT INTERNET EXPLORER

File Edit View Favorites Tools Help Address

Back Forward Stop Refresh Home Search Favorites History Channels Fullscreen Mail Print Edit CURTAILMENT MANAGEMENT | CURTAILMENT/SYSTEM SUMMARY | CURTAILMENT HISTORY | CUSTOMER STATUS | CUSTOMER HISTORY | LOGOUT

CUSTOMER STATUS

SELECT CUSTOMER: ALL

CUSTOMER INFO | CURTAILMENT STATUS | THERMOSTAT STATUS

CUSTOMER INFORMATION

THERE ARE 39 RECORDS: 1 | 2 | 3 | 4 NEXT PAGE #1

| NAME | ADDRESS | ACCOUNT# | SERIAL# | DIAL-IN-NUMBER |
|---|---|---|---|---|
| ALVIS, DAVID | 14440 SE 220 ST | | 5003055 | |
| ANDERSON, GREG | 24720 97 AVE S | | 5003113 | |
| BRASS, ROGER/MYERS, MARY | 24536 128PL S | | 5003152 | |
| BROWN, RANDY | 23101 128 PL SE | | 5003147 | |
| CARTER, REGINALD | 13820 SE 271 ST | | 5003058 | |
| CHAPMAN, SHEILA | 12030 SE 252 PL | | 5003054 | |
| COLEMAN, PHILLIP | 13510 250 ST SE | | 5003162 | |
| COMPTON, CHARLES | 11821 SE 228 PL | | 5003149 | |
| CRAWFORD, DONALD | 16202 SE 240 ST | | 5003158 | |
| CUNNINGHAM, BONNIE | 11911 SE 229 PL | | 5003060 | |

Done Local Internet zone

Figure 8B:
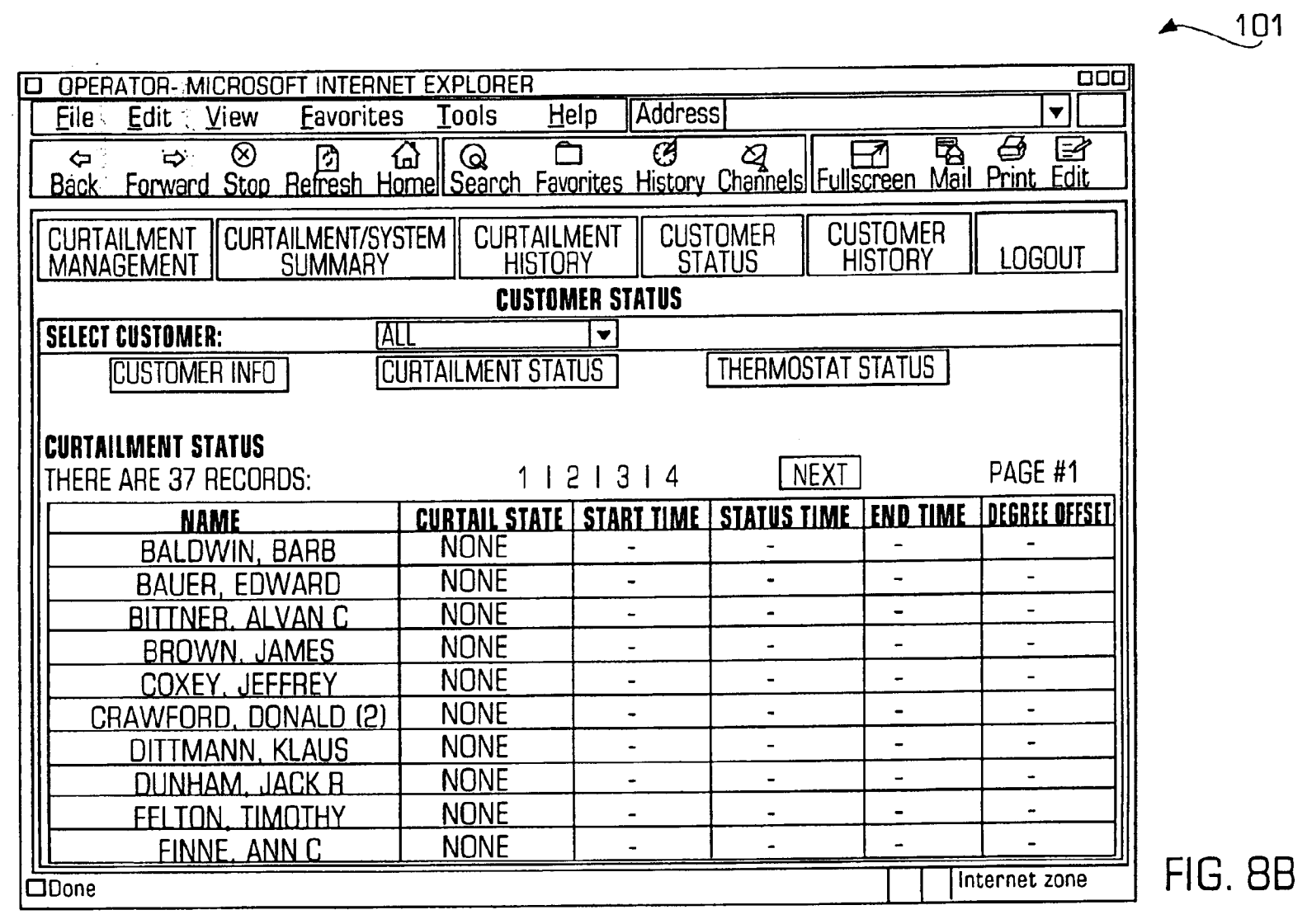

OPERATOR- MICROSOFT INTERNET EXPLORER

File Edit View Favorites Tools Help Address

Back Forward Stop Refresh Home Search Favorites History Channels Fullscreen Mail Print Edit CURTAILMENT MANAGEMENT | CURTAILMENT/SYSTEM SUMMARY | CURTAILMENT HISTORY | CUSTOMER STATUS | CUSTOMER HISTORY | LOGOUT

CUSTOMER STATUS

SELECT CUSTOMER: ALL

CUSTOMER INFO | CURTAILMENT STATUS | THERMOSTAT STATUS

CURTAILMENT STATUS

THERE ARE 37 RECORDS: 1 | 2 | 3 | 4 NEXT PAGE #1

| NAME | CURTAIL STATE | START TIME | STATUS TIME | END TIME | DEGREE OFFSET |
|---|---|---|---|---|---|
| BALDWIN, BARB | NONE | - | - | - | - |
| BAUER, EDWARD | NONE | - | - | - | - |
| BITTNER, ALVAN C | NONE | - | - | - | - |
| BROWN, JAMES | NONE | - | - | - | - |
| COXEY, JEFFREY | NONE | - | - | - | - |
| CRAWFORD, DONALD (2) | NONE | - | - | - | - |
| DITTMANN, KLAUS | NONE | - | - | - | - |
| DUNHAM, JACK R | NONE | - | - | - | - |
| FELTON, TIMOTHY | NONE | - | - | - | - |
| FINNE, ANN C | NONE | - | - | - | - |

Done Internet zone

Figure 8C:
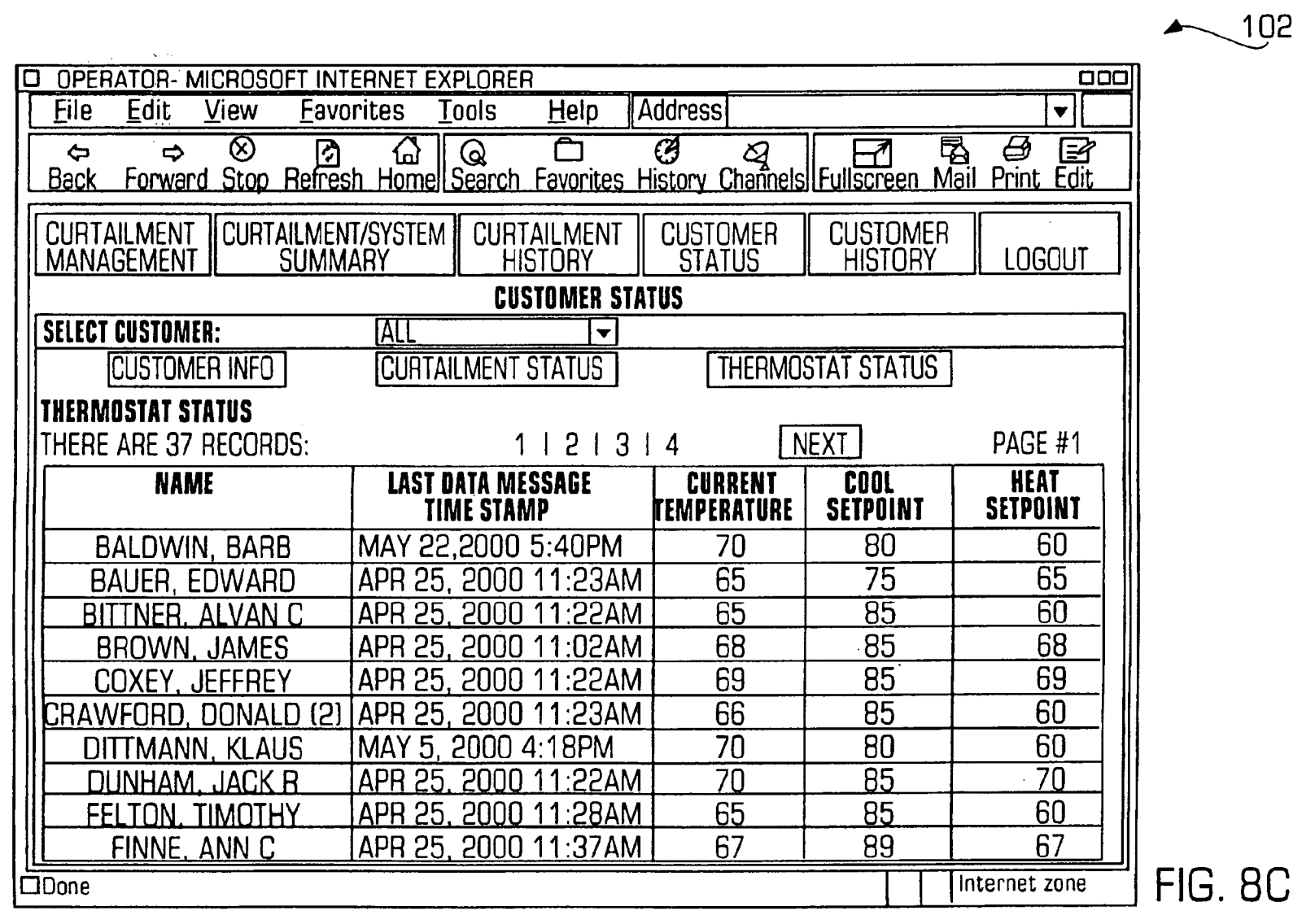

OPERATOR- MICROSOFT INTERNET EXPLORER

File Edit View Favorites Tools Help Address

Back Forward Stop Refresh Home Search Favorites History Channels Fullscreen Mail Print Edit CURTAILMENT MANAGEMENT | CURTAILMENT/SYSTEM SUMMARY | CURTAILMENT HISTORY | CUSTOMER STATUS | CUSTOMER HISTORY | LOGOUT

CUSTOMER STATUS

SELECT CUSTOMER: ALL

CUSTOMER INFO | CURTAILMENT STATUS | THERMOSTAT STATUS

THERMOSTAT STATUS

THERE ARE 37 RECORDS: 1 | 2 | 3 | 4 NEXT PAGE #1

| NAME | LAST DATA MESSAGE TIME STAMP | CURRENT TEMPERATURE | COOL SETPOINT | HEAT SETPOINT |
|---|---|---|---|---|
| BALDWIN, BARB | MAY 22,2000 5:40PM | 70 | 80 | 60 |
| BAUER, EDWARD | APR 25, 2000 11:23AM | 65 | 75 | 65 |
| BITTNER, ALVAN C | APR 25, 2000 11:22AM | 65 | 85 | 60 |
| BROWN, JAMES | APR 25, 2000 11:02AM | 68 | 85 | 68 |
| COXEY, JEFFREY | APR 25, 2000 11:22AM | 69 | 85 | 69 |
| CRAWFORD, DONALD (2) | APR 25, 2000 11:23AM | 66 | 85 | 60 |
| DITTMANN, KLAUS | MAY 5, 2000 4:18PM | 70 | 80 | 60 |
| DUNHAM, JACK R | APR 25, 2000 11:22AM | 70 | 85 | 70 |
| FELTON, TIMOTHY | APR 25, 2000 11:28AM | 65 | 85 | 60 |
| FINNE, ANN C | APR 25, 2000 11:37AM | 67 | 89 | 67 |

Done Internet zone

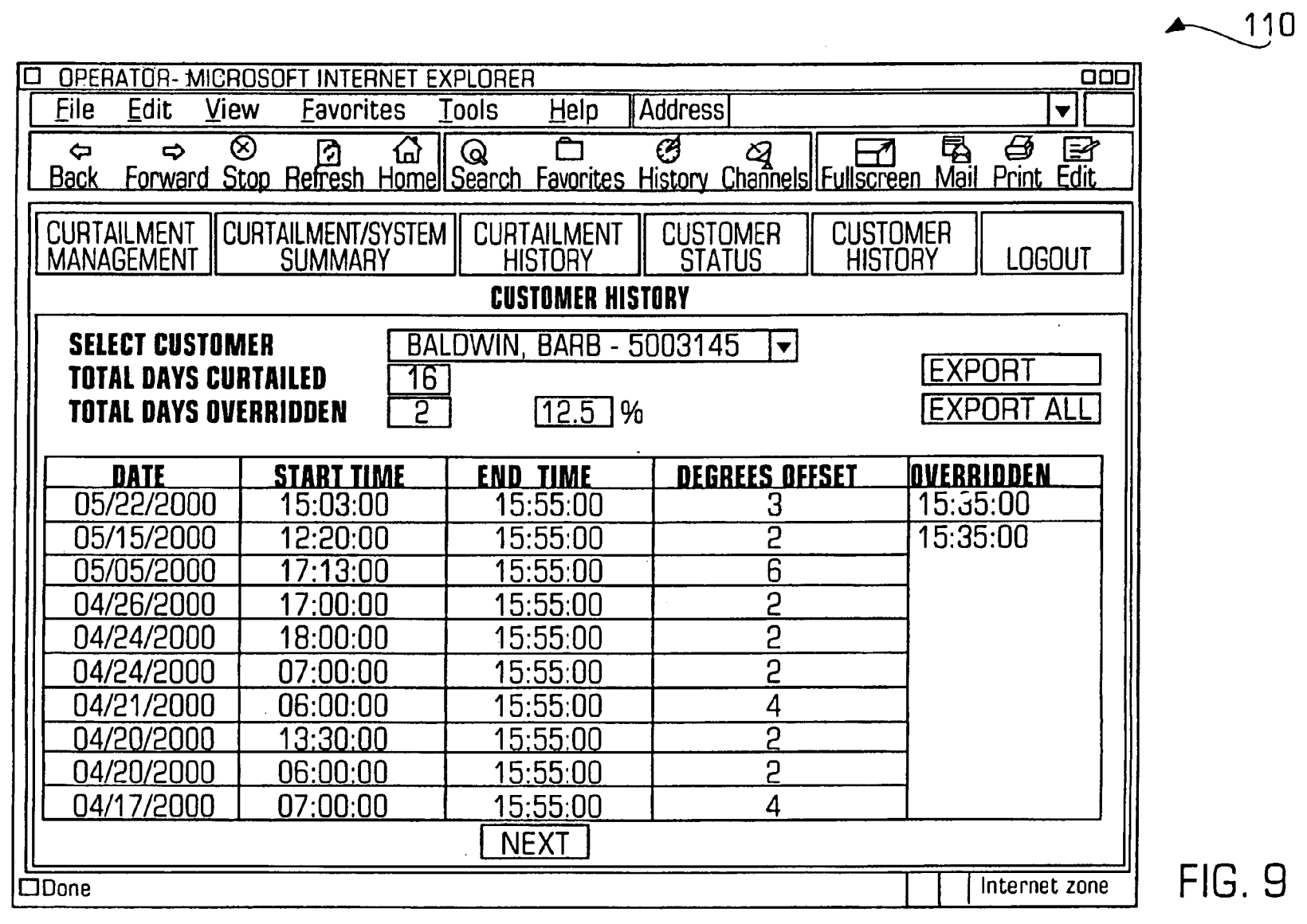

OPERATOR- MICROSOFT INTERNET EXPLORER

File Edit View Favorites Tools Help Address

Back Forward Stop Refresh Home Search Favorites History Channels Fullscreen Mail Print Edit CURTAILMENT MANAGEMENT | CURTAILMENT/SYSTEM SUMMARY | CURTAILMENT HISTORY | CUSTOMER STATUS | CUSTOMER HISTORY | LOGOUT

CUSTOMER HISTORY

SELECT CUSTOMER BALDWIN, BARB - 5003145

TOTAL DAYS CURTAILED 16

TOTAL DAYS OVERRIDDEN 2 12.5 %

EXPORT

EXPORT ALL

| DATE | START TIME | END TIME | DEGREES OFFSET | OVERRIDDEN |
|---|---|---|---|---|
| 05/22/2000 | 15:03:00 | 15:55:00 | 3 | 15:35:00 |
| 05/15/2000 | 12:20:00 | 15:55:00 | 2 | 15:35:00 |
| 05/05/2000 | 17:13:00 | 15:55:00 | 6 | |
| 04/26/2000 | 17:00:00 | 15:55:00 | 2 | |
| 04/24/2000 | 18:00:00 | 15:55:00 | 2 | |
| 04/24/2000 | 07:00:00 | 15:55:00 | 2 | |
| 04/21/2000 | 06:00:00 | 15:55:00 | 4 | |
| 04/20/2000 | 13:30:00 | 15:55:00 | 2 | |
| 04/20/2000 | 06:00:00 | 15:55:00 | 2 | |
| 04/17/2000 | 07:00:00 | 15:55:00 | 4 | |

NEXT

Done Internet zone

FIG. 9

SYSTEM AND METHOD FOR ENERGY USAGE CURTAILMENT

The present invention is related to a system and method for managing the use of energy.

BACKGROUND OF THE INVENTION

Energy management and energy cost management has always been an issue for many residents because of the increasing cost of energy. It is desirable to manage and analyze the energy consumption of a residence in order to reduce the total energy costs of the residence.

With a conventional energy management approach, a residence may manage its own energy. However, due to conventional energy management devices, such as thermostats and the like, it can be difficult for a residence to efficiently and effectively manage energy usage on its own. Unfortunately, conventional thermostat systems, while capable of maintaining a desired temperature in the residence, are not generally precise in maintaining a particular temperature and thus fluctuate through a temperature range. This fluctuation can result in varying energy consumption, and variable energy cost, just to maintain a particular temperature in the residence over time.

During peak energy demand periods, utilities and service providers are often forced to purchase short-term energy resources at prices that are significantly higher than average and pass on the high costs to its energy customers. Failure of utilities and service providers to maintain adequate energy resources can lead to power outages that affect the general public and can tarnish the reputation of the utilities and service providers and adversely affect their business. As a result, utility and service providers often lose millions of dollars every day in order to maintain adequate energy resources.

In order to manage peak energy demand periods, some utilities and service providers establish reduction compensation programs and pay consumers to temporarily reduce their energy consumption during peak energy demand periods. Advantageously, consumers electing to participate in a curtailment event (i.e., compensation program) may be incentivized by being able to purchase energy during peak energy demand periods at energy costs lower than normally available. However, due to the high volatility of wholesale energy prices and the absence of energy management systems for determining real-time information tracking energy usage, consumer participation in reduction compensation programs is limited.

To achieve large-scale energy reduction programs, utilities and service providers need to be able to rapidly inform consumers of high energy cost periods. Unfortunately, current curtailment programs lack historical data relating to high cost energy consumption by consumers, and do not rapidly inform consumers of peak energy demand periods. Thus, consumers generally are not afforded a cost savings benefit by participating in curtailment programs. Moreover, since wholesale power markets are ordinarily highly volatile, delays and notice periods can cause mismatches between the cost of energy actually purchased by the consumer and the market value of that purchased energy.

Further, conventional curtailment systems typically notify consumers of peak energy demand periods by broadcast facsimile or telephone messages, and conventional curtailment program administration does not currently support grouping consumers by program design, likely response, load zone, or other means. Conventional curtailment systems also do not provide the capability for both a service provider operator and a consumer user to view, in real-time, the results of participating in an energy reduction program.

Thus, there is a need for a system and method that affords customization of curtailment events for individual consumer users and provides real-time notification and monitoring of curtailment events. There is also a need for a system and method for remotely controlling a thermostat device in a residence to achieve efficient energy management. It is to these ends that the present invention is directed.

SUMMARY OF THE INVENTION

The present invention affords a system and method for performing energy usage management within a network. The system may include an energy management device, such as a thermostat device, that may be associated with an energy consuming entity, such as a residence. A server may be remotely located from the energy consuming entity and may perform one or more energy curtailment management operations within the network. The server may be in communication with the energy management system over the network. One or more software applications may be stored thereon for remotely controlling the energy management system in accordance with a particular energy curtailment management operation. Additionally, a database may be associated with the server for storing curtailment event information relating to the network.

A signal may be transmitted by the server to the thermostat device to alter an offset temperature setting of the thermostat device thereby remotely controlling the operation of the thermostat device. The thermostat device may also include a networking software application for enabling the remote monitoring and controlling of the thermostat device.

In accordance with one aspect of the invention, a software application for enabling remote monitoring and controlling of an energy management system within an energy consuming entity may include an indoor temperature indicator module for monitoring the current temperature of the entity, a temperature setpoint module for establishing operating temperature points for the energy management system, a system setting module for activating the energy management system and for selecting the mode of operation of the energy management system, and a curtailment event override module for overriding an active curtailment event.

In another aspect of the invention, a software application for monitoring one or more curtailment events within a network may include a curtailment manager module for initiating one or more load curtailment events within the network, a curtailment summary module for indicating curtailment event status information within the network, a curtailment history module for indicating historical curtailment information relating to current and prior curtailment events within the network, a user status module for indicating user-specific curtailment information, and a user history module for indicating curtailment history information relating to a particular user of the network.

The curtailment manager module includes an interface for selecting a starting time and duration for initiating one or more load curtailment events, and for selecting a particular offset temperature setting for remotely controlling preselected energy management systems within the network upon the occurrence of the load curtailment event. Curtailment event status information may include the current status of a curtailment event and the number of entities scheduled to participate in, or electing to override, the curtailment event. User-specific curtailment information may include current curtailment state information and energy management system-specific information. Energy management system-specific information may include current temperature information and temperature setpoint information.

In another aspect of the invention, a method for remotely controlling an energy management system, comprises the steps of establishing a data communication session with an energy management system, retrieving temperature information from the energy management system, altering temperature setpoint information for the energy management system to remotely program the operating conditions for the energy management system, and transmitting the altered temperature setpoint information to the energy management system for operating the energy management system.

BRIEF DESCRIPTION OF THE DRAWINGS

FIG. 7 is an exemplary representation of a user interface that may be displayed to a service provider operator upon accessing the curtailment history software application module of FIG. 4;

FIGS. 8A–8C are exemplary representations of a user interface that may be displayed to a service provider operator upon accessing the customer status software application module of FIG. 4;

FIG. 9 is an exemplary representation of a user interface that may be displayed to a service provider operator upon accessing the customer history software application module of FIG. 4.

DETAILED DESCRIPTION OF THE PREFERRED EMBODIMENT

Figure 1:
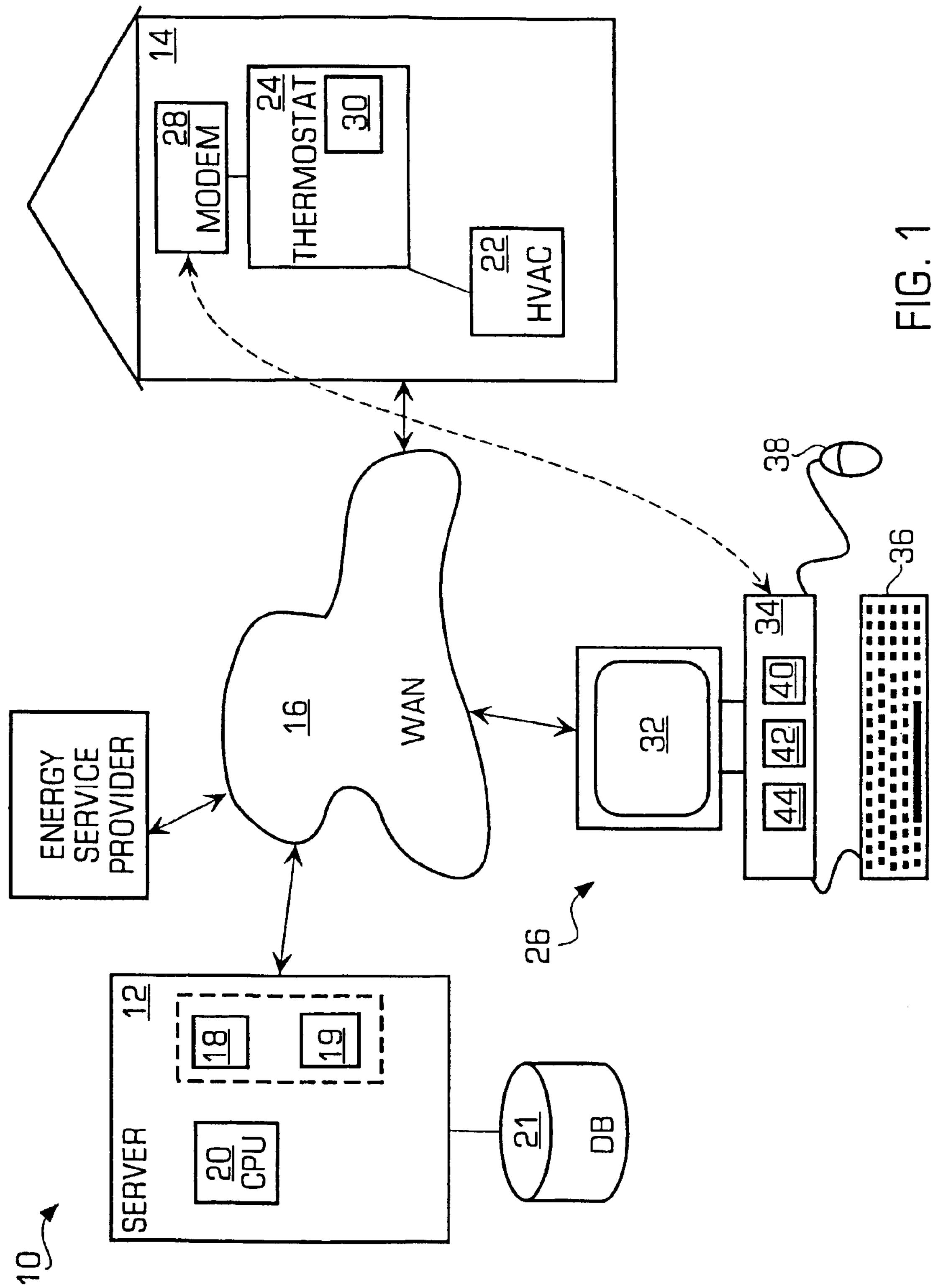
FIG. 1 is a diagram illustrating a load curtailment system in accordance with the invention.

FIG. 1 is a diagram illustrating a load curtailment system 10 in accordance with the invention. As shown, the load curtailment system 10 may include a server 12 connected with one or more client nodes 14 across a data network 16, such as a wide area network (WAN) 16. In a preferred embodiment, the data network may be the Internet, or more particularly, the World Wide Web. It should be noted that while the invention is described as being provided over the World Wide Web, it may also be provided over a local area network, such as an intranet, and other network structures.

The server 12 may include a first software application 18 for performing energy management functions within the network, and a second software application 19 for allowing the remote control of thermostat devices 24 at a client node 14 both of which may be executed by a CPU 20. The software applications 18, 19 will be described in more detail below. A database 21 may be associated with the server 12 for storing curtailment event and other information relating to different client nodes 14 within the system 10. Preferably, the server 12 may be capable of sustaining a high transaction rate, such as hundreds of transactions per second, and may utilize local queuing layers for handling bursty traffic. The system is preferably scalable to support the addition of other client nodes. Advantageously, the functionality of the server 12 may be distributed across multiple CPUs and may employ a unique "push" technology to rapidly deliver targeted information securely via the network.

The client nodes 14 may be associated with different energy consumers, such as individual residences. The client nodes 14 may include devices that operate and consume energy, such as an HVAC unit 22. The client nodes 14 may also include the thermostat device 24 connected with the HVAC unit 22 for controlling the operation of the HVAC unit 22. The thermostat device 24 may be controlled remotely, for example by the server 12, via modern 28 or other similar communications device, such as by transmitting a signal over the Internet 16 to alter the offset temperature of the thermostat device 24 and thereby control the operation of the HVAC unit 22 remotely. Such two-way Internet control is described in more detail in Assignee's co-pending patent application Ser. No. 09/677,484, filed Sep. 28, 2000, and herein incorporated by reference.

The thermostat device 24 is preferably a 7-day programmable thermostat available from Carrier Corporation; however, those skilled in the art will recognize that other thermostat devices may be utilized without departing from the invention. The thermostat device 24 may include a networking software application 30 that operates in conjunction with the application code of the thermostat device 24 to enable remote monitoring and controlling of the thermostat device 24. For example, the software application 30 enables communication with and data transmission to and from the residence, and the server 12 via the Internet 16.

Figure 2:
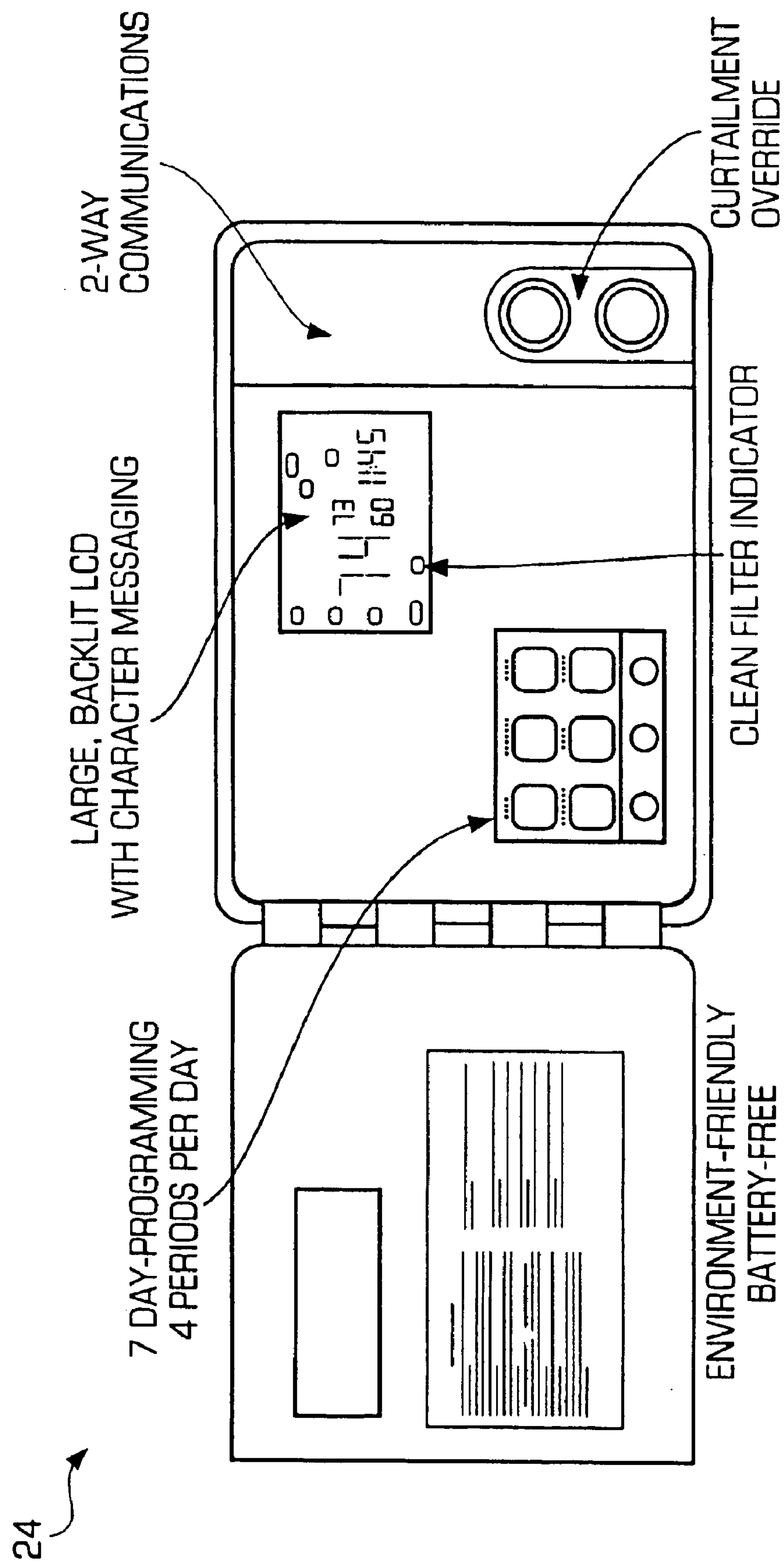
FIG. 2 is an exemplary representation of a thermostat device that may be utilized by the system of FIG. 1.

Advantageously, the thermostat device 24 may provide numerous functions for controlling indoor temperature and optimize energy efficiency. For example, the thermostat device 24 may reduce energy consumption by gradually adjusting the temperature within the residence, or by activating and de-activating the energy consuming device system accordingly. Additionally, for example, the thermostat device 24 may automatically switch between heating and cooling operation during periods when both heating and cooling are necessary. Moreover, to optimize energy efficiency, the thermostat device 24 may notify the residence when an HVAC air filter is needed to be cleaned or replaced to maintain optimal indoor air quality and energy efficiency. FIG. 2 is an exemplary representation of a thermostat device 24 that may be utilized by the present invention.

The thermostat device 24 shown in FIG. 2 may be a 7-day programmable thermostat device 24 and may permit temperature programming for multiple periods during a day. The thermostat device 24 may include a communications port 25*a* permitting two-way communications between the thermostat device 24 and a remote system, such as the server 12, via the Internet as described in Assignee's co-pending U.S. patent application Ser. No. 09/677,484, filed Sep. 28, 2000, which was incorporated by reference above. The thermostat device 24 may also include a large, backlit LCD display screen 25*b* for indicating temperature settings and other message information, such as a clean filter indicator 25*c* for notifying a user of the need to replace the system air filter, The thermostat device 24 may also include a curtailment override button 25*d* for enabling a user to independently choose to override participation of a curtailment event. Advantageously, the thermostat device 24 is environmentally friendly and may be operated electronically without requiring a battery.

Referring again to FIG. 1, the computer system 26 that may be connected with the thermostat device 24 may include a display device 32, a CPU unit 34, one or more user input devices, such as a mouse 36 and a keyboard 38 and may be configured to communicate with the server 12 over the WAN 16. The CPU unit 34 may house a permanent storage system 40, such as a hard disk drive, optical disk drive, tape drive, or the like, which may store one or more software applications such as a web browser application. The computer system 26 may have a resident memory 42 and the software application from the disk 40 may be transferred to the memory 42 to be executed by a CPU 44. A browser application may connect the computer system 26 to the server 12 over the WAN 16 and receive data and graphical information (such as web pages, reports, etc.) that may be displayed on the display device 32 of the computer system 26. The browser application may also permit the computer system 26 to interact with the server 12, such as for monitoring energy usage of different residences and for generating energy usage reports, or for remotely controlling a thermostat device 24.

Figure 3:
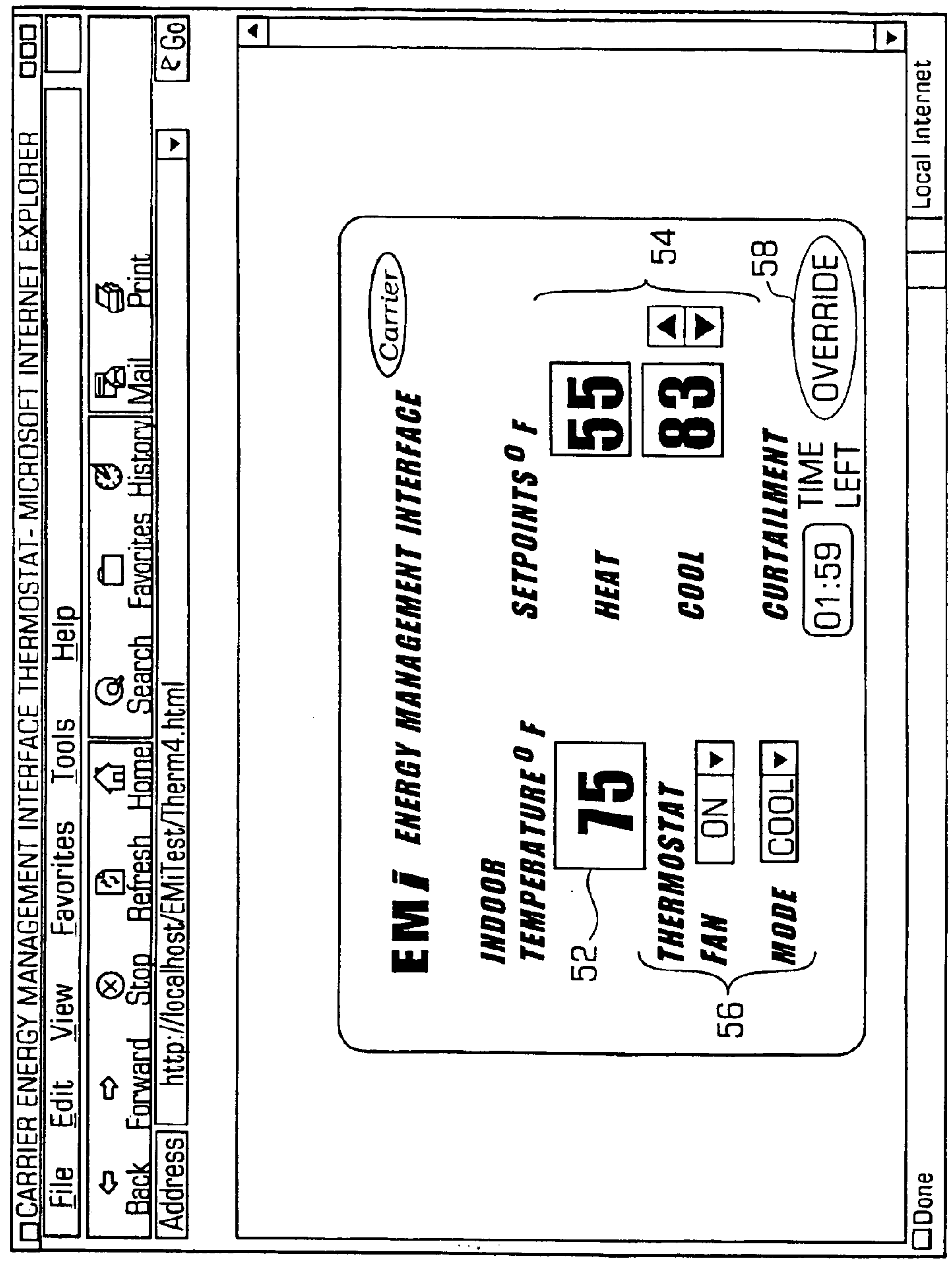
FIG. 3 is an exemplary screenshot of a user interface for remotely controlling a thermostat device in accordance with the invention.

FIG. 3 is an exemplary screenshot of a user interface 50 for remotely controlling a thermostat device in accordance with the invention. A user may access the server 12 (FIG. 1) via the Internet 16, such as by using a web browser software application, as described above. Upon accessing the server 12, the second software application 19 resident thereon may cause a particular user interface 50 to be displayed to the user on the display device 32 of the user's computer system. The user interface 50 may allow the user to remotely control the thermostat device 24, such as by modifying the temperature setpoints of the thermostat device 24, by interacting with the user interface 50 as will be described below.

The user interface 50 may include an indoor temperature indicator area 52 for indicating the indoor temperature at a particular residence with which the thermostat device 24 is associated. Preferably, temperature may be indicated on a Fahrenheit scale, however, other temperature indicator scales may be utilized without departing from the invention. The user interface 50 may also include a temperature setpoint area 54 for indicating heating and cooling temperature settings for setting the operating temperature points for the thermostat device 24. Advantageously, the user may manipulate the temperature values in the setpoint area 54, such as by interacting with increase/decrease temperature buttons 56 to change the desired setpoint temperatures for the thermostat device 24. Preferably, the setpoint temperatures may be indicated on a Fahrenheit scale, however, other temperature indicator scales may be utilized without departing from the invention.

The user interface 50 may also include a thermostat setting area 56 for remotely activating the thermostat fan and for selecting the mode of operation (e.g., heating or cooling) for the thermostat device 24. Additionally, the user interface 50 may include a curtailment notice area 58 for indicating the time remaining for a particular curtailment event and for allowing a user to override a currently active curtailment event participation.

Figure 4:
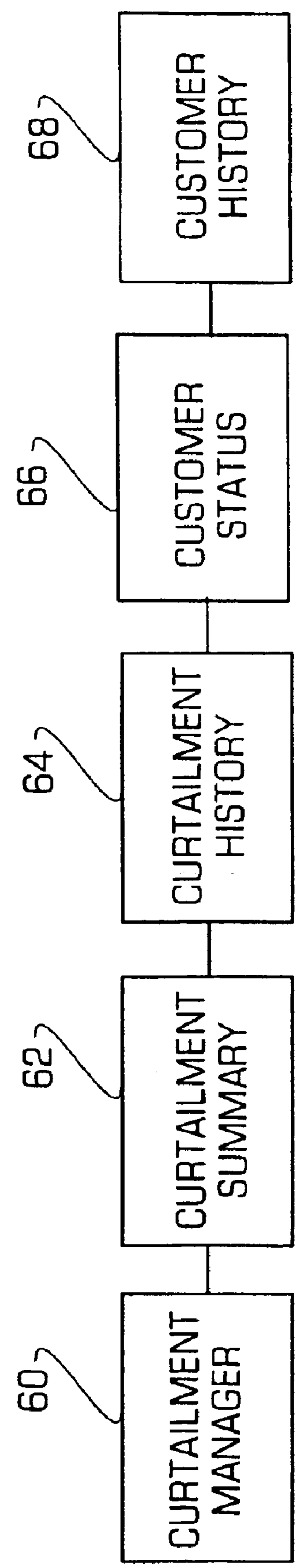
FIG. 4 is a block diagram illustrating the software modules that make up the curtailment management system embodied as the first software application of FIG. 1.

The first software application 18 resident on the server 12 (FIG. 1) may include different application modules for operating as a curtailment management system in accordance with the invention. FIG. 4 is a block diagram illustrating the software modules that make up the curtailment management system embodied as the first software application 18. Other software application modules may be provided and the following are merely exemplary.

As shown in FIG. 4, the software application modules may include a curtailment manager software application module 60 for initiating load curtailment events within the network. A load curtailment event is broadly defined as any event causing reduction in peak energy demand within the system. Creation of curtailment events is described in detail in Assignee's co-pending U.S. patent application Ser. No. 09/675,999, filed Sep. 28, 2000, and herein incorporated by reference. The software application modules may also include a curtailment summary software module 62 for indicating information relating to curtailment event participation, a curtailment history software module 64 for identifying prior curtailment event information, a customer status software module 66 and a customer history software module 68 for indicating customer information. The above modules may be enabled for performing curtailment management operations and will be described in more detail below.

In operation, an operation service provider may access the server 12 and log into the first software application 18, such as by entering a unique user identifier and password. Once the user is logged into the application 18, the service provider operator may select from the different application modules shown in FIG. 4 for operating the residential curtailment manager system. For example, the user may initiate a curtailment event, may view a curtailment summary or curtailment history information, and may review customer history and/or status information.

Figure 5:
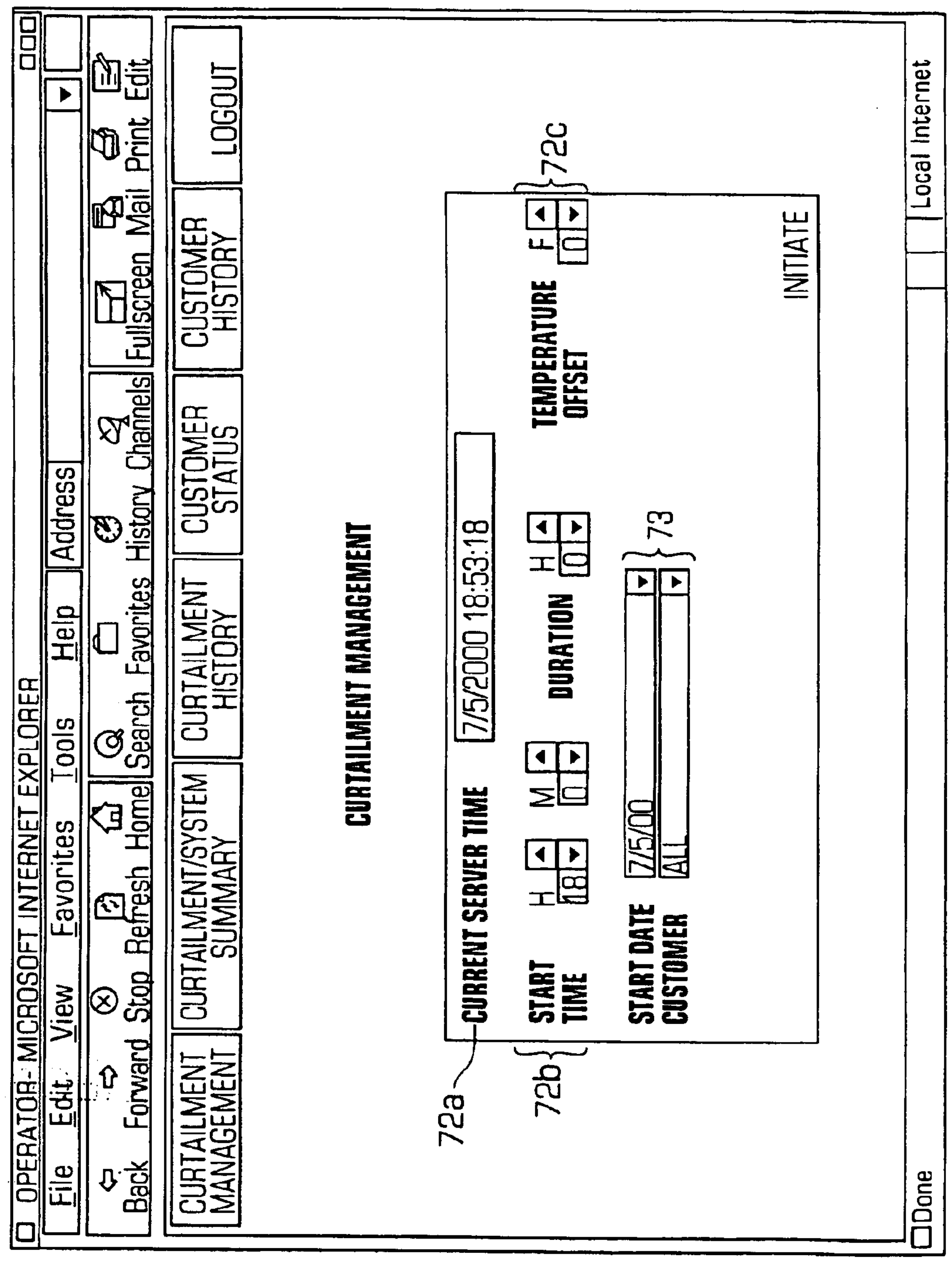
FIG. 5 is an exemplary representation of a user interface that may be displayed to a service provider operator upon accessing the curtailment management software application module of FIG. 4.

For example, a service provider operator may access the server 12 and initiate a curtailment event. Upon accessing the server 12 to initiate a curtailment event, the software application 18 may invoke the curtailment management software application module 60 that may cause a user interface 70 to be displayed to the service provider operator to facilitate initiation of curtailment events. An exemplary screenshot of a user interface 70 is shown in FIG. 5. The user interface 70 may display the current time 72*a*, and provide an interacting means for the service provider operator to establish and initiate a new curtailment event. As shown, the user interface 70 may display, in an area 72*b*, a customizable start time for establishing the starting time for a curtailment event, and a customizable duration (e.g., in hours) for the curtailment event. The user interface 70 may also display, in another area 72*c*, the offset temperature (e.g., Fahrenheit scale) for remotely controlling a thermostat device 24 during the curtailment event. Finally, the user interface 70 may have an area 73 to allow the service provider operator to establish the date for the curtailment event, and select to which customers to direct the curtailment event.

Preferably, only one curtailment initiation message is transmitted to a thermostat device 24 when the server 12 is communicating with the thermostat device 24; but additional messages may be transmitted without departing from the invention. Moreover, the thermostat device 24 preferably receives curtailment event commands up to 24 hours in advance of the start of the event; however, the device 24 may receive event commands earlier or just before the event.

Figure 6:
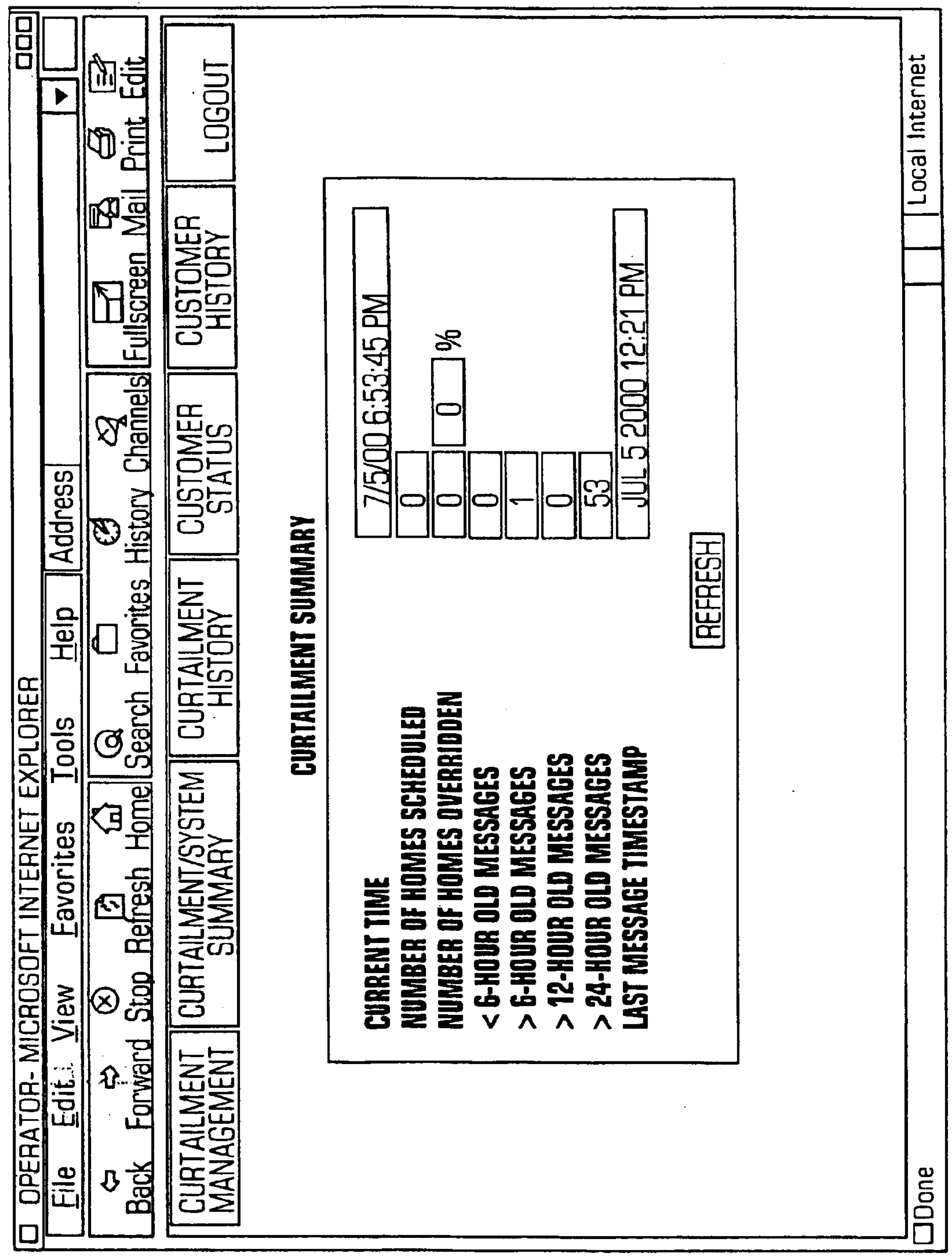
FIG. 6 is an exemplary representation of a user interface that may be displayed to a service provider operator upon accessing the curtailment summary software application module of FIG. 4.

A service provider operator may also access the server 12 and review a curtailment summary. Upon accessing the server 12 to review a curtailment summary, the software application 18 may invoke the curtailment summary software module 62 shown in FIG. 4 that may cause a user interface 80 to be displayed to the service provider operator to facilitate review. An exemplary screenshot of a user interface 80 is shown in FIG. 6. The user interface 80 may display the current status of a curtailment event showing the number of residential households scheduled or overridden. The user interface 80 may also display tallies of thermostat devices 24 having reporting message timestamps occurring at particular periods, such as less than 6, 12, or 24 hours old. The last timestamp of the last message received from a thermostat device 24 may also be indicated. Preferably, the service provider operator may review this information to determine the efficiency and operation of the system.

A service provider operator may also access the server 12 and review curtailment history information. Upon accessing the server 12 to review curtailment history information, the software application 18 may invoke the curtailment history software module 64 that may cause a user interface 90 to be displayed to the service provider operator to facilitate review. An exemplary screenshot of a user interface 90 is shown in FIG. 7. The user interface 90 may display the historical summaries of both current and prior curtailment events. Preferably, curtailment summaries are displayed in reverse chronological order; however, the user may display the curtailment summaries in any desired order. Information that may be displayed includes curtailment event dates and times, temperature offset information, number of households scheduled to participate in the event, the number of households overriding participation in the event, and the percentage of households overriding a particular curtailment event participation. Other information may be displayed and the above is merely exemplary.

A service provider operator may also access the server 12 and review customer status information. Upon accessing the server 12 to review customer status information, the software application 18 may invoke the customer status software module 66 shown in FIG. 4 that may cause a user interface 100 to be displayed to the service provider operator to facilitate review. Exemplary screenshots of a user interface 100 are shown in FIGS. 8A–8C. The user interface 100 of FIG. 8A may display customer information, such as customer address, customer account number, customer serial number, customer telephone number, and other customer-specific information. The user interface 101 of FIG. 8B may display customer curtailment status information, such as the current curtailment state (i.e., none, scheduled, override) of customers. Depending on the current curtailment state of the customer, different information may be displayed by the user interface 101. For example, for a scheduled state, the start time, end time and degree offset information for a curtailment event may be displayed. For an override state, the time a customer performed a curtailment override may be displayed. The user interface 102 of FIG. 8C may display thermostat device 24 status information, such as current temperature, and cool setpoint and heat setpoint information.

A service provider operator may also access the server 12 and review customer history information. Upon accessing the server 12 to review customer history information, the software application 18 may invoke the customer history software module 68 shown in FIG. 4 that may cause a user interface 110 to be displayed to the service provider operator to facilitate review. An exemplary screenshot of a user interface 110 is shown in FIG. 9. The user interface 110 of FIG. 9 may display curtailment history information for a particular customer. Advantageously, curtailment history information may be exported as database records that can be incorporated into spreadsheet format to facilitate data management.

Figure 10:
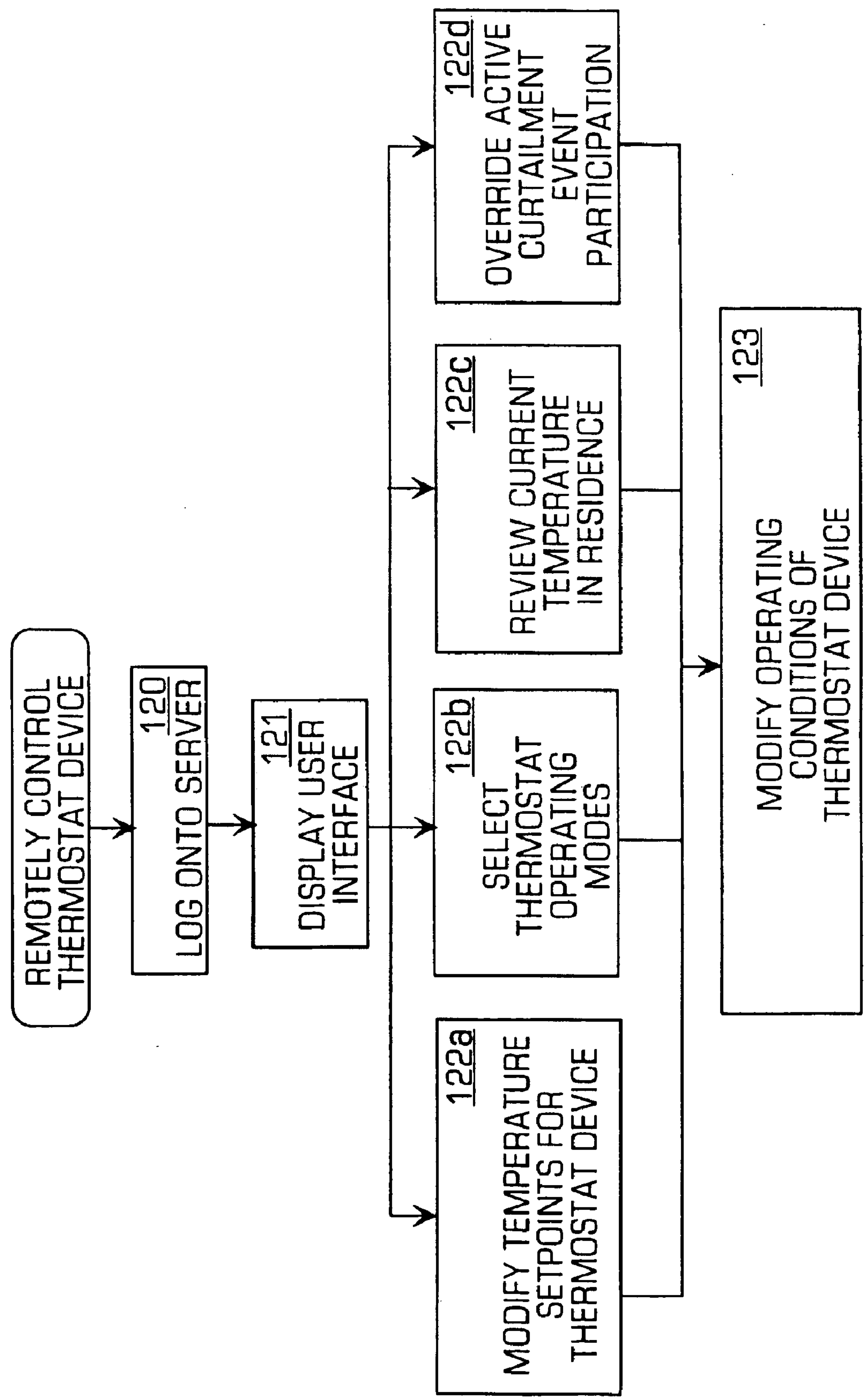
FIG. 10 is a flowchart showing a preferred method of operation of the system in accordance with the invention.

FIG. 10 is a flowchart illustrating a preferred method of operation for the system described above. Initially, a user may log onto the server 12 (FIG. 1), as described above, and access the second software application 19 to remotely control a thermostat device 24 in the user's residence (Step 120). Upon accessing the second software application 19, the software application 19 may cause a user interface to be displayed to the user allowing the user to remotely control the thermostat device 24 (Step 121). The user may modify the temperature setpoints of the thermostat device 24 (Step 122*a*), select thermostat operating modes (Step 122*b*), review current temperature within the residence (Step 122*c*), or select whether to override a currently active curtailment event participation (Step 122*d*) as described above. The system may then modify the operating conditions of the thermostat device 24 accordingly (Step 123).

Accordingly, the present invention affords a user the ability to remotely control a thermostat device 24 within a residence. By using the invention, commercial and industrial users may respond to and benefit from requests for load reduction. Both market price based curtailment programs and legacy interruptable load programs are supported by the invention. Advantageously, data gathering and event participation patterns may also be customized, and end-user participation may be logged and can be presented in a variety of different forms to both consumers and service provider operators. Also, multiple time zones for customers and events may be supported.

While the foregoing has been described with reference to particular embodiments of the invention, such as a system and method for remotely controlling a thermostat device within a residence, the invention is not limited to such embodiments and may be applicable to any system capable of performing the described advantages. It will be appreciated by those skilled in the art that changes in these embodiments may be made without departing from the principles and spirit of the invention. For example, while the system has been described in the context of including different software applications for performing both curtailment management and remote controlling of thermostat devices, those skilled in the art will recognize that the functionality of different software applications may be combined into a single application having respective modules for performing as the invention.

What is claimed is:

1. A system for performing energy usage management within a network, comprising:

a thermostat associated with an energy consuming entity, a server remote from the energy consuming entity for performing one or more energy curtailment management operations within the network, the server being communicatively connected to the thermostat over the network and having a software application thereon for remotely controlling the thermostat in accordance with a particular energy curtailment management operation; and a database associated with the server for storing curtailment event information relating to the network.

2. The system of claim 1, wherein the energy consuming entity is a residence.

3. The system of claim 1, wherein a signal is transmitted by the server to the thermostat device to alter an offset temperature setting of the thermostat device.

4. The system of claim 1, wherein the thermostat device includes a networking software application for enabling the remote monitoring and controlling of the thermostat device.

5. In a system for performing energy usage management, a software application for enabling remote monitoring and controlling of an energy management system within an energy consuming entity, comprising:

an indoor temperature indicator module for monitoring the current temperature of the entity;

a temperature setpoint module for establishing operating temperature points for the energy management system;

a system setting module for activating the energy management system and for selecting the mode of operation of the energy management system; and a curtailment event override module for overriding an active curtailment event.

6. In a system for performing energy usage management, a software application for monitoring one or more curtailment events within a network, comprising:

a curtailment manager module for initiating one or more load curtailment events within the network;

a curtailment summary module for indicating curtailment event status information within the network;

a curtailment history module for indicating historical curtailment information relating to current and prior curtailment events within the network;

a user status module for indicating user-specific curtailment information; and a user history module for indicating curtailment history information relating to a particular user of the network.

7. The software application of claim 6, wherein the curtailment manager module includes an interface for selecting a starting time and duration for initiating one or more load curtailment events, and for selecting a particular offset temperature setting for remotely controlling pre-selected energy management systems within the network upon the occurrence of the load curtailment event.

8. The software application of claim 6, wherein the curtailment event status information includes the current status of a curtailment event and the number of entities scheduled to participate in, or electing to override, the curtailment event.

9. The software application of claim 6, wherein the user-specific curtailment information includes current curtailment state information and energy management system-specific information.

10. The software application of claim 9, wherein the energy management system-specific information includes current temperature information and temperature setpoint information.

11. A system performing energy usage management within a network, comprising:

a server remote from and in communication with an energy management system associated with an energy consuming entity, the server having a software application thereon for remotely monitoring and controlling the energy management system in accordance with an energy curtailment management operation, the software application including:

an indoor temperature indicator module for monitoring the current temperature of the entity;

a temperature setpoint module for establishing operating temperature points for the energy management system;

a system setting module for activating the energy management system and for selecting the mode of operation of the energy management system; and a curtailment event override module for overriding an active curtailment event; and a database associated with the server for storing curtailment event information relating to the network.

12. The system of claim 11, wherein the energy consuming entity is a residence.

13. The system of claim 11, wherein the energy management system is a thermostat device.

14. A method for remotely controlling an energy management system, comprising the steps of:

establishing a data communication session with an energy management system;

retrieving temperature information from the energy management system;

altering temperature setpoint information for the energy management system to remotely program the operating conditions for the energy management system; and transmitting the altered temperature setpoint information to the energy management system for operating the energy management system.

15. The method of claim 14, wherein controlling the energy management system further comprises controlling a thermostat.

* * * * *